US011022497B2

(12) United States Patent
Liang

(10) Patent No.: US 11,022,497 B2
(45) Date of Patent: Jun. 1, 2021

(54) INFRARED THERMOMETER FOR MAGNETIC INDUCTION IDENTIFICATION PROBE CAP

(71) Applicant: FAMIDOC TECHNOLOGY CO., LTD, Guangdong Province (CN)

(72) Inventor: Cao Liang, Guangdong Province (CN)

( * ) Notice: Subject to any disclaimer, the term of this patent is extended or adjusted under 35 U.S.C. 154(b) by 243 days.

(21) Appl. No.: 16/131,657

(22) Filed: Sep. 14, 2018

(65) Prior Publication Data
US 2019/0242753 A1 Aug. 8, 2019

(30) Foreign Application Priority Data
Feb. 8, 2018 (CN) .......................... 201820222976.7

(51) Int. Cl.
*G01J 5/00* (2006.01)
*G01K 1/00* (2006.01)
*G01J 5/02* (2006.01)
*G01J 5/04* (2006.01)
*G01J 5/08* (2006.01)

(52) U.S. Cl.
CPC .............. *G01J 5/027* (2013.01); *G01J 5/021* (2013.01); *G01J 5/026* (2013.01); *G01J 5/0265* (2013.01); *G01J 5/049* (2013.01); *G01J 5/0865* (2013.01)

(58) Field of Classification Search
USPC ................. 374/131, 120, 121, 208; 600/474
See application file for complete search history.

(56) References Cited

U.S. PATENT DOCUMENTS 4,790,324 A * 12/1988 O'Hara ..................... G01J 5/02
374/126

\* cited by examiner

*Primary Examiner* — Mirellys Jagan
(74) *Attorney, Agent, or Firm* — HYIP

(57) ABSTRACT

The present disclosure discloses an infrared thermometer for a magnetic induction identification probe cap, including the body of the infrared thermometer, at an upper end of which is a temperature probe designed with a cap, of which an inner side wall is beset with a magnet block; in the infrared thermometer body at a lower end of the temperature probe is a magnetic induction element connected with a main control unit of the body of the infrared thermometer; when the cap covers the temperature probe or is removed there-from, the magnetic induction between the magnet block and the magnetic induction element enables magnetic induction output control signals. For the infrared thermometer applicable for both forehead temperature measurement and ear canal temperature measurement, the magnetic induction identification probe cap switches between a forehead temperature measurement mode and an ear canal temperature measurement mode.

5 Claims, 2 Drawing Sheets

INFRARED THERMOMETER FOR MAGNETIC INDUCTION IDENTIFICATION PROBE CAP

FIELD

The subject matter relates to a temperature measuring device, especially to an infrared thermometer for a magnetic induction identification probe cap.

BACKGROUND

A thermometer is an extremely common and frequently used kind of temperature measuring device. Under normal circumstances, one may feel sick when his/her body temperature exceeds 37.5° C., so many people deploy thermometers in their homes. With the advancement of technologies, a great many types of new thermometers have been developed, such as electronic thermometers and infrared thermometers. By taking advantage of identified relation between physical parameters (e.g. resistance, voltage, and current, etc.) of some substances and ambient temperature, electronic thermometer shows body temperature digitally, featuring clear readings and good portability. Its shortage lies in the fact that the accuracy of indicated values is affected by electronic elements and battery states, etc. Infrared thermometers include thermometers designed exclusively for ear temperature and solely for forehead temperature. Since the liquid in ear canals of users with otitis media may significantly impair the accuracy of IR ear thermometers, IR ear thermometers is not suitable for them. Where the room temperature is above 25° C. or below 20° C., IR forehead thermometers may frequently be affected by ambient temperature. For instance, sweating, fanning and air conditioning, etc. may affect forehead temperature to a certain extent. For this reason, relevant technology development combines IR ear temperature and IR forehead temperature measurements in one infrared thermometer. Infrared thermometers designed for measurement of both ear temperature and forehead temperature are normally designed with removable caps for preventing faulty operation or supporting the automatic mode recognition. At present, an automatic induction & identification of cap is substantially realized in the following manner: Tact Switch or other devices are controlled for state switching after physical deformation; then, the cap is identified after MCU identification, as shown in FIG. 1. This scheme requires a lot of accessories, which make trouble in assembly; moreover, mechanical structure may frequently goes wrong.

SUMMARY

To make up for the defects of above-noted technologies, the present disclosure offers an infrared thermometer for a magnetic induction identification probe cap.

The technical scheme provided by the present disclosure: An infrared thermometer for a magnetic induction identification probe cap, which is characterized by the fact that it includes the body of the infrared thermometer, at an upper end of which is a temperature probe designed with a cap, of which an inner side wall is beset with a magnet block; in the infrared thermometer body at a lower end of the temperature probe is a magnetic induction element connected with a main control unit of the infrared thermometer body; when the cap covers the temperature probe or is removed therefrom, magnetic induction between the magnet block and the magnetic induction element enables the magnetic induction output control signals.

Further, the body of the infrared thermometer is applicable for measurement of forehead temperature and ear canal temperature, solely for forehead temperature measurement or solely for ear canal temperature measurement.

Further, the magnetic induction element is a reed switch or Hall sensor.

The magnetic induction outputs control signal includes magnetic induction outputting an identification indicating removal of the cap; the magnet block and the magnetic induction element of cap performs induced output of a startup control signal; when the cap covers the temperature probe, the magnetic induction outputs a power-off control signal; the startup control signal and the power-off control signal are used for the infrared thermometer for forehead temperature measurement or ear canal temperature measurement.

The magnetic induction outputs control signals includes the main control unit outputs a forehead temperature measurement mode of when the cap covers temperature probe; and an ear canal temperature measurement mode when the cap is removed from the temperature probe based on the magnetic induction between the magnet block on the cap and the magnetic induction element on the body of the infrared thermometer; switchover between the forehead temperature measurement mode and the ear canal temperature measurement mode, enables switchover between the forehead temperature measurement and the ear canal temperature measurement.

The infrared thermometer with above-mentioned technical solution of the magnetic induction identification probe cap replaces common mechanical probe pin through the magnetic induction outputting control signals, as shown in FIG. 1. By means of the magnetic induction, the inner wall of the cap is beset with the magnet block, while corresponding magnetic induction elements are arranged in the body of the infrared thermometer for concealed induction, which contributes to more concise appearance. The main control unit of the infrared thermometer body controls startup and power-off based on output of the magnetic induction so as to replace traditional startup and power-off keys. The magnetic induction outputs control signals identifying startup and power-off; this has application in the infrared thermometers designed exclusively for forehead temperature measurement or ear canal temperature measurement. For the infrared thermometer applicable for both forehead temperature measurement and ear canal temperature measurement, the magnetic induction outputs control signals enables switchover between the forehead temperature measurement mode and the ear canal temperature measurement mode. Mode switching is needed because a built-in algorithm of the forehead temperature measurement is different from that of the ear canal temperature measurement. The magnetic induction identification probe cap is used to replace common mechanical probe pin. This technical solution is characterized by more efficient, easier operation and longer service life.

DETAILED DESCRIPTION

The present disclosure is further demonstrated below based on the attached drawings and specific embodiments.

Figure 1:
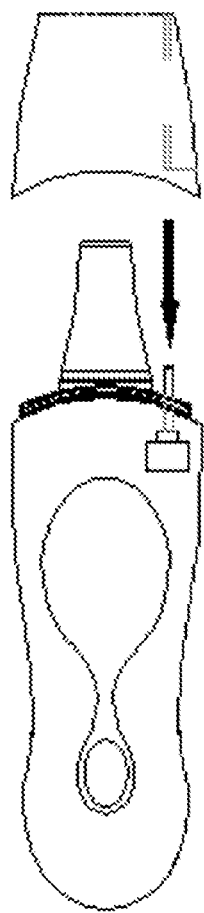
FIG. 1 is a structural schematic diagram of switching temperature measurement mode scheme through traditional probe contact connection key.
Figure 2:
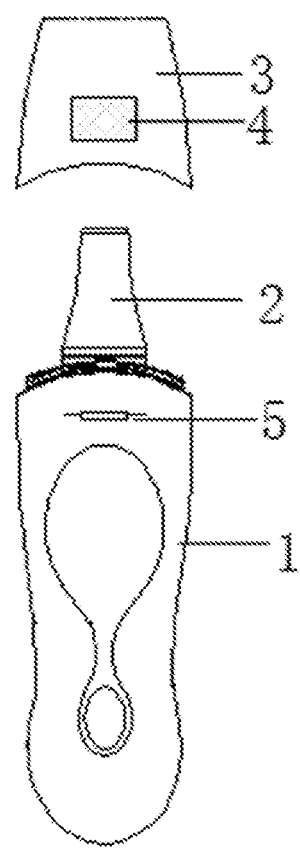
FIG. 2 is a structural schematic diagram of identifying the output control signal through magnetic induction according to an embodiment of the present disclosure.

FIG. 2 shows an infrared thermometer with a magnetic induction identification probe cap that includes a body of the infrared thermometer 1, at an upper end of the body of infrared thermometer 1 is a temperature probe 2 designed with a cap 3, of which an inner side wall is beset with a magnet block 4; in the infrared thermometer body at a lower end of temperature probe 3 is a magnetic induction element 5 connected with a main control unit of the infrared thermometer body 1; when the cap 3 covers the temperature probe 2 or is removed therefrom, the magnetic induction between the magnet block 4 and the magnetic induction element 5 enables magnetic induction output control signals.

Preferably, the body of the infrared thermometer is applicable for measurement of both forehead temperature and ear canal temperature, solely for forehead temperature measurement or solely for ear canal temperature measurement.

Preferably, the magnetic induction element is a reed switch or Hall sensor.

Preferably, the magnetic induction outputting control signals includes the magnetic induction outputting an identification cap indicating removal of the cap 3; the magnet block 4 and the magnetic induction element 5 performs induced output of a startup control signal; when the cap 3 covers the temperature probe 2, the magnetic induction outputs a power-off control signal; the startup control signal and the power-off control signal are used for the infrared thermometer for the forehead temperature measurement or the ear canal temperature measurement.

The magnetic induction outputting control signal includes the main control unit outputting a forehead temperature measurement mode when the cap 3 covers the temperature probe 2; and an ear canal temperature measurement mode when the cap is removed from the temperature probe 2 based on the magnetic induction between the magnet block 4 on the cap 3 and the magnetic induction element 5 on the body of the infrared thermometer; switchover between the forehead temperature measurement mode and the ear canal temperature measurement mode, enables switchover between the forehead temperature measurement and the ear canal temperature measurement.

By dint of the magnetic induction, the inner wall of cap 3 is beset with the magnet block 4, while corresponding magnetic induction elements 5 are arranged in the body of the infrared thermometer 1 for concealed induction, which contributes to more concise appearance. The main control unit of the infrared thermometer body 1 controls startup and power-off based on the outputting of the magnetic induction so as to replace traditional startup and power-off keys. Magnetic induction outputs control signals identifying startup and power-off; this has application in infrared thermometers designed exclusively for forehead temperature measurement or ear canal temperature measurement. For the infrared thermometer applicable for both the forehead temperature measurement and the ear canal temperature measurement, the magnetic induction outputs identifications to enable switchover between the forehead temperature measurement and ear canal temperature measurement modes. Mode switching is needed because the built-in algorithm of the forehead temperature measurement is different from that of the ear canal temperature measurement. The magnetic induction identification probe cap 3 can be used to replace a traditional cap probe mechanical key or body key. The technical scheme is characterized by more efficient and easier operation, and longer service life.

The foregoing embodiments of the present dislcosure are merely intended to clearly describe the subject matter, but not to restrict the embodiments of the present dislcosure. The obvious changes or modifications derived from the essential spirit of the present dislcosure are still within the protection coverage of the present application.

The invention claimed is:

1. An infrared thermometer for a magnetic induction identification probe cap, the infrared thermometer comprising the body of the infrared thermometer at an upper end of which is a temperature probe designed with a cap of which an inner side wall is beset with a magnet block; wherein in the body of the infrared thermometer at a lower end of the temperature probe is a magnetic induction element connected with a main control unit of the infrared thermometer;

and when said cap covers the temperature probe or is removed therefrom, a magnetic induction between the magnet block and the magnetic induction element enables the magnetic induction element to output control signals.

2. The infrared thermometer for a magnetic induction identification probe cap described in claim 1, wherein the body of the infrared thermometer is an infrared thermometer applicable for both forehead temperature measurement and ear canal temperature measurement, an infrared thermometer solely suitable for forehead temperature measurement, or an infrared thermometer exclusively applicable for ear canal temperature measurement.

3. The infrared thermometer for a magnetic induction identification probe cap described in claim 1, wherein said magnetic induction element is a reed switch or a Hall sensor.

4. The infrared thermometer for a magnetic induction identification probe cap described in claim 1, wherein said magnetic induction between the magnet block and the magnetic induction element enables the magnetic induction element to output control signals that include the magnetic induction outputting an identification indicating a removal of the cap and the magnetic induction element performing an induced output of a startup control signal based on the identification; when the cap covers the temperature probe, the magnetic induction outputs a power-off control signal; and the startup control signal and the power-off control signal are used by the infrared thermometer for forehead temperature measurement or ear canal temperature measurement.

5. The infrared thermometer for a magnetic induction identification probe cap described in claim 1, wherein said magnetic induction between the magnet block and the magnetic induction element enables the magnetic induction element to output control signals that include the main control unit outputting a forehead temperature measurement mode when the cap covers the temperature probe and an ear canal temperature measurement mode when the cap is removed from the temperature probe based on the magnetic induction between the magnet block in the cap and the magnetic induction element in the infrared thermometer body; and a switchover between the forehead temperature measurement mode and the ear canal temperature measurement mode enables a switchover between a forehead temperature measurement and an ear canal temperature measurement.

\* \* \* \* \*